Nov. 11, 1941. D. SCHMIDT Re. 21,945
DESTRUCTIBLE OIL CONTAINER
Original Filed Aug. 7, 1936
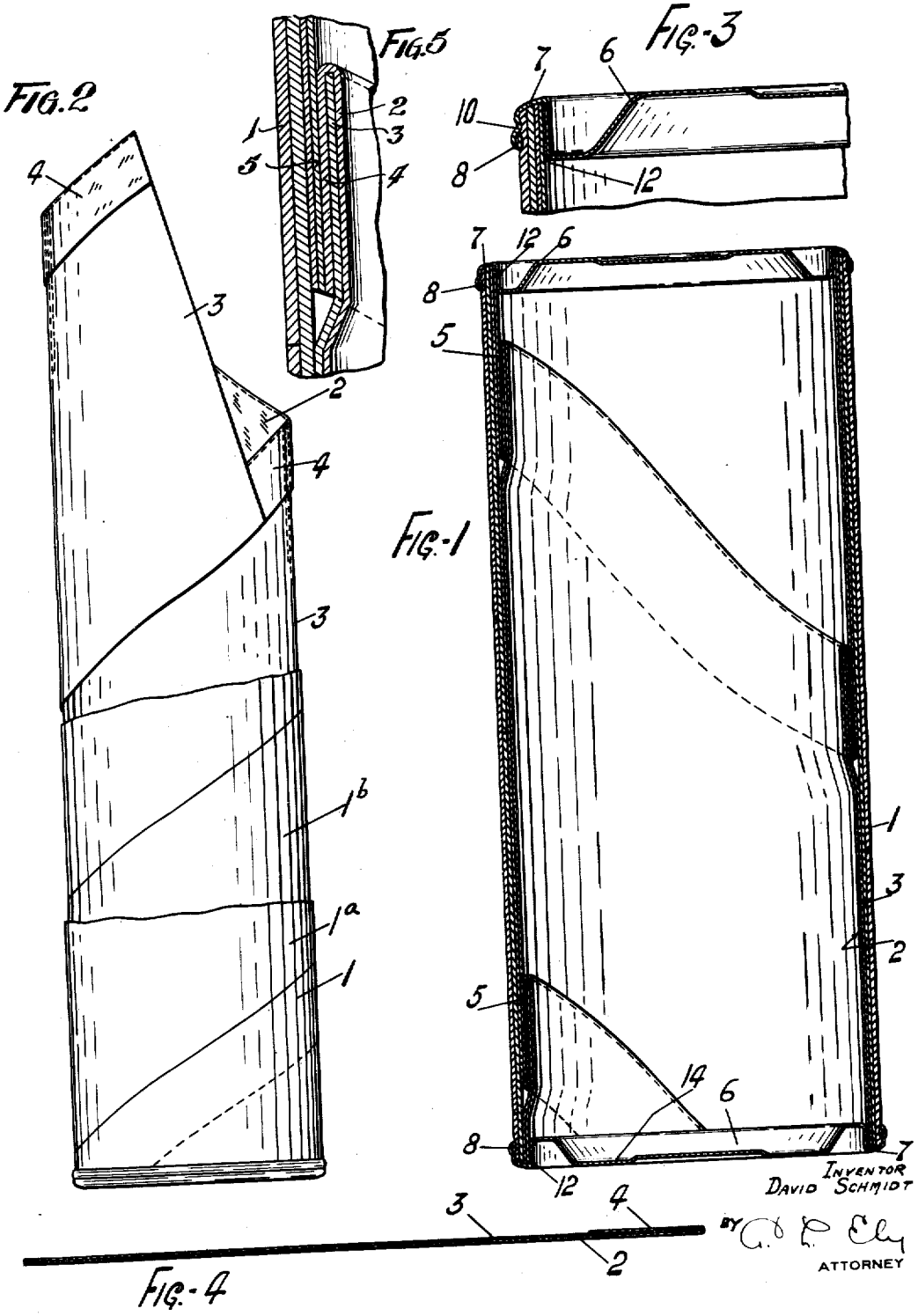

Reissued Nov. 11, 1941 Re. 21,945

UNITED STATES PATENT OFFICE 21,945

DESTRUCTIBLE OIL CONTAINER

David Schmidt, Lakewood, Ohio, assignor to The Dobeckmun Company, Cleveland, Ohio, a corporation of Ohio Original No. 2,110,843, dated March 8, 1938, Serial No. 94,776, August 7, 1936. Application for reissue February 21, 1940, Serial No. 320,169

8 Claims. (Cl. 229—14)

The present invention relates to the manufacture of a container, the body portion of which is made of a paper stock, preferably cardboard, chipboard, or similar materials, it being the purpose to devise a container, the major portion of which can be destroyed easily, as by burning.

The especial purpose of the invention has been to provide a container of this type in which motor oil could be packaged and shipped. The retail sale or oil from bulk has been recently supplanted by the sale of oil from individual cans, so that the customer is assured of receiving standard brands and qualities of oil. This practise has given rise to a number of objectionable features, a major difficulty being the destruction of the empty containers. The cans which are usually of tin, are not easily destructible, and the disposition of them is an expensive and troublesome operation. In addition, the oil tends to cling to the metal surfaces of the can and it is necessary that the manufacturer place an additional quantity of oil in each can to compensate the customer for the oil which clings to the interior of the can.

It has been proposed heretofore, to construct cans from paper stocks, but it has been difficult to make an oil tight can due to the very "searching" property of oil.

It is the purpose of the present invention to design and construct a can of this type which will be leak and seep proof, and the present inventor has perfected such a container by the means shown and described herein. By providing a seam in the lining which cannot be pulled apart by possible shrinkage or embrittlement of the lining, and by providing a seam which permits a union, which may be in the nature of a weld, between adjacent backed edges of the lining, the present inventor has perfected a container which will be leak and seep proof throughout the life of the container. It will be understood that the illustration and description is of the best known or preferred form of the invention, and that modifications and changes may be made retaining the essential and characteristic features of the invention.

In the drawing:

Fig. 1 is a vertical cross section through the improved container, illustrating the various features thereof which have made it possible to construct an oil proof container of this type;

Fig. 2 is a view showing the body of the can broken away in the several plies or layers and illustrating the constructional details thereof;

Fig. 3 is an enlarged view at the edge of the can showing the detailed construction whereby the end of the can is fastened to the body;

Fig. 4 is a detail of the oil proof inner lining; and

Fig. 5 is an enlarged detail drawing of the overlapping spiral seam.

The container comprises the main or body portion 1, which is formed of spirally wound layers or plies of a heavy paper stock, such as cardboard, strawboard, chipboard, or the like. This is preferably formed of a plurality of plies, two plies $1^a$ and $1^b$ being illustrated. The plies, whether two or more, are adhesively secured together and laid with the seams out of register. This form of cardboard tubing is old and well known.

The oil resistant properties are secured by an inner lining of an oil proof sheet which is indicated by the numeral 2. This is preferably a sheet made from regenerated cellulose sheeting, known by the trade name "Cellophane," or equivalent material, such, for example, as any cellulosic or other film which is oil proof. These materials which are well known oil resistant substances, have the added advantages that they readily "shed" oil, so that the amounts previously essential to give full measure in the old metallic cans, are reduced with the improved container.

It has been proposed heretofore to line a container with "Cellophane" or similar films. Nonfibrous films similar to "Cellophane" may be of several general types such as, organic esters of cellulose, cellulose ethers, rubber hydrohalides, or polyvinyl films. Examples of organic esters of cellulose are cellulose acetate, cellulose butyrate and cellulose propionate or mixed cellulose esters; examples of cellulose ethers are ethyl cellulose, methyl cellulose, and butyl cellulose; an example of rubber hydrohalide is rubber hydrochloride, such as the film known commercially as "Pliofilm"; examples of polyvinyl films are polyvinyl acetate and polyvinyl chloride, such as the film known commercially as "Vinylite." With "Cellophane," or any similar films used as a lining stock, however, it has been difficult to secure the proper application of the liner to the body of the container or to secure a satisfactory seam which will remain leaf-proof and seep-proof throughout the life of the container. The present construction secures this result, as will be now set forth.

The oil proof lining 2 is first secured to an inner paper lining 3 by any of the usual laminating processes suitable and well known for the purpose. The lining 2 may be secured to the backing 3 by the well known thermoplastic cements. The edge of the backing 3 is protected by folding the oil proof sheet about the edge of the backing as shown at 4 in Fig. 4. The paper which is employed is readily adhered to the inner turns of the body during the process of making the tube, which is illustrated in Fig. 2.

It will be seen that the reversely folded edge portion 4 overlaps the adjacent edge of the next spiral turn and contacts with the oil proof lining on the next adjacent ply so that a seal is made between two surfaces of the lining. This is shown at 5 in Fig. 1 and is also illustrated in Fig. 2. The joint at this point is made by a suitable adhesive which will resist the oil and will securely adhere the opposed surfaces of the "Cellophane" or other lining. Such an adhesive may be of the type previously described. A solution of zinc chloride may be employed at this point, as this material softens the surfaces of the cellulose sheets and causes the two surfaces to unite into an oil proof seal.

The paper stock is thin and flexible so that it may be readily wrapped about the usual mandrel or former. The showing in Fig. 1 is necessarily exaggerated for the purpose of adequately illustrating the construction. In fact, the seam is only slightly perceptible.

The lining which has been described, is one of the essential features of the invention which consists in first laminating the oil proof liner to a paper backing and then incorporating this compound sheet, as the inner ply of the container, adhering the backing sheet to the inner wall of the main body. There is no leakage or seeping of oil through the spiral joint thus formed. The paper backing is relatively thin so that the added thickness caused by the overlapping is reduced to a minimum. This secures a tight joint at the ends of the can where a relatively thick overlap would give rise to crevices.

The end of the container gives a serious problem in the manufacture of a satisfactory oil proof container. In the form shown, the ends are closed by round metal caps or disks 6, the outer peripheries of which are provided with channels 7 in which the edges of the container are seated. The rim of the disk is turned over to provide the curled edge 8 and this is crimped against the outer wall. The channel is made somewhat deeper than is customary, and this provides for an additional and supplemental crimp 10 about the can. A coating of a suitable lute or filler 12 is applied about the inner wall of the channel as a part of the sealing operation.

In the ordinary can of this type, the center of the cap or disk is usually within the plane of the edge portion. It has been found that this construction gives rise to leakage due to the heavy character of the contents, as the weight of the oil on the unsupported central area of the disk causes it to spread at the seal. To obviate this objectionable feature, the cap in the present construction is supported by extending it flush with or slightly beyond the plane of the lower edge of the can. Such an expedient is shown in Fig. 1, in which the disk is formed with a circular rib 14, which affords a support for the disk and prevents spreading of the seam. Any suitable formation of the disk may be adopted provided that the weight of the oil is prevented from bending the disk outwardly.

The container shown and described herein forms an oil tight receptacle for the transportation and storage of oil. It solves the problem of providing a can, the body of which may be easily destroyed. It is more economical of oil and is cheaper and better in many ways than the standard tin can which has been used for the purpose. It is obvious, however, that this invention is not limited to the specific embodiment or to the specific use of the embodiment disclosed, either in whole or in part, but it is limited only by the appended claims.

What is claimed is:

1. A destructible oil proof container comprising a body portion formed of spirally wound heavy paper stock, and an inner oil proof lining composed of a sheet of oil resistant material laminated to a thin paper backing, the composite sheet being spirally wound with its adjacent edges in overlapped relation and adhesively secured to the inner body wall, the edge of the backing being enclosed in a reversely turned fold of the oil proof material, which reverse fold is adhesively secured to the face of the oil proof sheet immediately adjacent thereto.

2. A destructible oil proof container comprising a body portion formed of paper stock, and an inner oil proof lining composed of a sheet of oil resistant material laminated to a thin paper backing, the composite lining being spirally wound with its adjacent edges in overlapped relation and attached to the inner body wall, the edge of the backing being enclosed in a reversely turned fold of the oil proof material, which reverse fold is adhesively secured to the face of the oil proof sheet immediately adjacent thereto.

3. A destructible oil proof container comprising a body portion formed of a heavy paper stock, and an inner oil proof lining composed of a sheet of relatively thin paper and a regenerated cellulose sheeting laminated thereto with an edge of the thin paper enclosed in a reversely turned laminated fold of the cellulose sheeting, the lining being spirally wound with its adjacent edges in overlapped relation and the reversely turned portion of the cellulose sheeting adhesively secured to the face of the sheeting on the next adjacent turn, said lining being secured to the inner body wall.

4. A container comprising a body portion formed of a heavy paper stock and an inner lining comprised of a sheet of relatively thin paper and a non-fibrous film laminated thereto with an edge of the thin paper enclosed in a reversely turned laminated fold of the non-fibrous film, the lining being spirally wound with its adjacent edges in overlapped relation and the reversely turned portion of the film united to the face of the film on the next adjacent turn, said lining being united to the inner wall of the body portion.

5. In a container, a body portion formed of heavy paper stock, and a lining comprised of a sheet of lining stock and a sheet of relatively thin paper laminated thereto with an edge of said thin paper enclosed within a reversely turned laminated fold of the lining stock, said lining being spirally wound with the reversely turned fold overlapping the edge of the next adjacent turn of the lining and being united thereto, said lining being secured to the inner body wall.

6. In a container, an outer body and a lining comprised of a strip of lining stock, a narrower strip of relatively thin paper, the face of said paper strip being laminated to the back of said lining stock and a marginal portion of said lining stock being reversely folded over an edge of said narrower paper strip and laminated to the back thereof to form a laminated lining strip, said laminated lining strip being spirally wound so that the reversely folded marginal portion of said lining stock overlaps and is united to the face of the next adjacent turn of the laminated lining strip, whereby the lining presents a continuous inner surface of lining stock and a substantially continuous outer surface of paper adapted to be secured to the inner wall of the outer body.

7. A liner for a container body comprising a strip of lining stock, a narrower strip of relatively thin paper laminated to the back of said strip of lining stock, a marginal portion of said strip of lining stock being reversely folded over an edge of said narrower paper strip and laminated to the back thereof to form a laminated lining strip, said laminated lining strip being spirally wound so that a marginal portion of the lining stock is united to the reversely folded marginal portion of the lining stock in the preceding turn of the laminated lining strip.

8. A liner for a container comprising a strip of lining stock, a marginal portion of said strip being reversely folded so that said reversely folded marginal portion of the face of the lining stock extends over a marginal portion of the back of the strip, said strip being spirally wound so that an unfolded marginal portion of the inwardly disposed face of one turn of the strip overlaps and is united to the outwardly disposed reversely folded marginal portion of the preceding turn of the strip, whereby the seam joining successive turns of the strip of lining stock affords a face-to-face union between said successive turns of said strip of lining stock.

DAVID SCHMIDT.